United States Patent [19]

Marco

[11] E Re. 28,914

[45] *Reissued July 20, 1976

[54] TREATMENT OF A CELLULOSIC-CONTAINING TEXTILE WITH A FLUOROCARBON, AN AMINOPLAST, AND A SYNTHETIC ACID COPOLYMER, AND TEXTILE OBTAINED THEREFROM

[75] Inventor: Francis W. Marco, Spartanburg, S.C.

[73] Assignee: Deering Milliken Research Corporation, Spartanburg, S.C.

[ * ] Notice: The portion of the term of the patent subsequent to Apr. 9, 1985, has been disclaimed.

[22] Filed: July 11, 1972

[21] Appl. No.: 270,784

Related U.S. Patent Documents

Reissue of:

[64] Patent No.: 3,597,145
Issued: Aug. 3, 1971
Appl. No.: 622,086
Filed: Mar. 10, 1967

[52] U.S. Cl. ..... 428/272; 2/243 A; 8/115.6; 38/144; 204/159.12; 204/160.1; 260/29.4 U A; 260/29.6 F; 427/36; 427/44; 427/390; 427/392; 428/274; 428/275; 428/278; 428/279

[51] Int. Cl.[2] ..... D06M 15/58; D06M 15/54

[58] Field of Search... 117/161 UT, 143 A, 138.8 F, 117/139.4, 161 LN, 161 UZ, 161 UC, 161 UF; 8/116.3, 115.6; 427/36, 44, 390, 392; 428/272, 274, 275, 278, 279

[56] References Cited

UNITED STATES PATENTS

| | | | |
|---|---|---|---|
| 2,804,402 | 8/1957 | Williams | 8/116.3 X |
| 2,810,624 | 10/1957 | Wardell | 8/116.3 X |
| 2,974,432 | 3/1961 | Warnock et al. | 8/116.3 X |
| 2,977,665 | 4/1961 | McElrath | 8/116.3 X |
| 2,987,421 | 6/1961 | Sherwood | 8/116.3 X |
| 3,101,275 | 8/1963 | Cairns et al. | 8/115.6 X |
| 3,125,405 | 3/1964 | Gordon | 8/116.3 |
| 3,236,685 | 2/1966 | Caldwell et al. | 117/138.8 E |
| 3,377,249 | 4/1968 | Marco | 8/115.6 |
| 3,503,915 | 3/1970 | Peterson | 260/851 X |

OTHER PUBLICATIONS

J. Berch and H. Peper: "Wet Soiling of Cotton," *Textile Research Journal*, vol. 34, No. 1, Jan. 1964, pp. 29–34.

"A Study of Fluorocarbon Finishes and Their Effect on Dyestuffs," *American Dyestuff Reporter*, Oct. 31, 1960, p. 33–38.

*Primary Examiner*—Harry J. Gwinnell
*Assistant Examiner*—William H. Schmidt
*Attorney, Agent, or Firm*—H. William Petry; Arthur L. Urban

[57] ABSTRACT

A process for imparting oil and water repellency, soil release, and durable press characteristics to a cellulosic-containing textile material and product produced by this process, comprising applying thereto an aminoplast textile resin, a textile resin catalyst, a fluorocarbon, and a synthetic acid copolymer, and curing at a temperature of 100–200°C.

22 Claims, No Drawings

TREATMENT OF A CELLULOSIC-CONTAINING TEXTILE WITH A FLUOROCARBON, AN AMINOPLAST, AND A SYNTHETIC ACID COPOLYMER, AND TEXTILE OBTAINED THEREFROM

Matter enclosed in heavy brackets [ ] appears in the original patent but forms no part of this reissue specification; matter printed in italics indicates the additions made by reissue.

BACKGROUND OF THE INVENTION

The textile industry during the past decade has, as a whole, made important technological advances in the chemical finishing of textile fabrics. Numerous processes have been developed for imparting minimum care characteristics to garments and articles prepared from specially treated textile fabrics. Exemplary of such advances are the wash and wear fabrics, hereinafter referred to as precured fabrics, and the durable press fabrics, hereinafter referred to as post cured fabrics. These characteristics generally have been imparted to textile fabrics by the application of resinous materials. The resinous materials are applied to the fabric and are later crosslinked to the fabric by the action of a suitable catalyst. Depending upon the time at which the crosslinking reaction occurs, either a wash and wear fabric or a durable press fabric is produced. The precured fabrics are those for which the crosslinking reaction has occurred prior to transformation of the fabric into a garment or other article of commerce. Post cured fabrics are those fabrics which are subjected to the crosslinking reaction subsequent to the transformation of the fabric into a garment or other article of commerce.

The precured and post cured fabrics, by way of fiber content, may contain any of a number of natural or synthetic materials. Presently, however, the majority of these fabrics include synthetic, man-made fibers. These synthetic fibers offer tremendous advantages to the fabrics as opposed to fabrics containing only the natural materials. One drawback, however, is the fact that the synthetic fibers have a propensity to soiling and as such, the garment during normal wear may come into contact with oily type materials which are accepted due to the oleophilicity of the synthetic fibers. These oily type materials, however, are very hard to remove due to the hydrophobic properties of the synthetic fibers. Accordingly, once the garment comes into contact with these stain-producing materials, it cannot be cleaned by wash and wear laundering procedures, but must be dry cleaned to successfully remove the stains from the garment. Furthermore, even in the absence of the stain-producing material, repeated washing of a garment including synthetic fibers causes the garment to assume a dingy gray color due to soil that is picked up in the wash water. Such soil pickup is referred to as "soil redeposition."

The soiling problem previously mentioned brought about a still further technological innovation in the textile industry—a wash and wear or durable press fabric having soil release characteristics. The term "soil release" does not infer soil resistance, but only the characteristic that once a fabric is soiled, it may then be successfully cleaned via the normal wash cycle. Furthermore, the fabrics, and/or garments that are treated to have soil release characteristics also have the characteristic of not taking up soil from the wash water, i.e., soil in the wash water will not be redeposited onto the garment being washed.

Paralleling the development of durable press and wash and wear fabrics has been the work in imparting oil and water repellency to fabrics. Numerous means have been developed for imparting water repellency to fabrics including the following types of water repellent substances; (1) wax emulsions; (2) water repellents based on pyridinium compounds, long chain fatty amides, resin-wax mixtures; (3) silicones; (4) organochromium compounds; and (5) fluorochemicals.

The fluorochemical type water repellents are probably the most commonly used water repellent today. Two commercially available fluorochemical compositions are FC-208, the fluorocarbon ingredient of Scotchgard treated fabrics, sold by Minnesota Mining and Manufacturing Company and Zepel, a water repellent fluorochemical sold by E. I. du Pont de Nemours & Co. A certain degree of oil repellency is generally achieved with the water repellency imparted to the fabrics treated with the fluorocarbons.

One drawback of water and oil repellent fabrics is the difficulty in removing stains by laundering. The water and oil repellency characteristics, of course, render a fabric both hydrophobic and oleophobic and presumably resistant to any water or oil. Under normal circumstances, this resistance provides a degree of protection from soiling. However, when oil, for instance, is forced into the fabric by rubbing and/or pressure, it cannot be removed by laundering due to the fact that the fabric is hydrophobic and will not accept water that is necessary for removal of the oil. For example, while rainwear garments repel falling rain, etc., in use these garments are stained with oils from the body of the wearer particularly at the collar and the cuffs. These stains may be partially removed during dry cleaning, but the dry cleaning process adversely affects the water repellency characteristic of the garment. On the other hand, these oil stains will not be removed in normal laundering.

Heretofore, it was not considered possible for a fabric to have oil and water repellency and also soil release characteristics. This was because the oil and water repellency were believed to be achieved due to hydrophobicity and oleophobicity of the fibers making up the fabric or treatments increasing the hydrophobicity and oleophobicity. On the other hand, soil release was considered to be achieved with fibers which were hydrophilic in nature or by treatments to increase the hydrophobicity of the fibers. Thus, oil and water repellency were considered to be directly opposite to the characteristics required for soil release.

An object of the present invention is to provide textile material with the heretofore unattainable combination of soil and water repellency characteristics together with soil release characteristics.

A further object of the invention is to provide a fabric including synthetic polymeric fibers which has soil and water repellency and soil release characteristics.

Another object of the invention is to provide a fabric from which stains can be removed by laundering without destroying the water and oil repellency characteristics of the fabric.

An additional object of the invention is to provide a fabric including synthetic polymeric fibers which not only has the combination of water and oil repellency and soil release characteristics but also possesses durable press and/or wash and wear characteristics.

SUMMARY OF THE INVENTION

In accordance with the present invention, water repellency, oil repellency and soil release characteristics are imparted to a textile material by a process which comprises applying to the textile material a soil release polymer and a water and oil repellent material. Preferably, the textile material is subjected to textile resin curing conditions. Advantageously, a textile resin and a textile resin catalyst also are applied to the textile material.

The process of the present invention may be used to treat a wide variety of textile materials, i.e., fabrics made exclusively from naturally occurring fibers, fabrics made exclusively from synthetic polymeric fibers, as well as blends of natural and synthetic fibers. The process of the present invention may be utilized on fabrics containing cellulosic fibers, for example, cotton, viscose, regenerated cellulose, etc. Examples of fabrics of synthetic fibers which may be successfully employed in the practice of the present invention include those made with polyamide, acrylic and particularly polyester fibers, i.e., various types of Dacron, a registered trademark of E. I. Du Pont; Fortrel, a registered trademark of Celanese; Kodel, a registered trademark of Eastman Kodak, etc. Blends of natural and synthetic fibers which may be utilized to prepare fabrics according to the present process include fabrics comprising 50% polyester and 50% cotton; 65% polyester and 35% cotton; etc.

Several theories have been advanced as to proper fabric construction for obtaining optimum water repellency properties. One such theory states that the fabric should be woven in such a manner that the warp and filling elements are very tightly woven together, whereas the other theory states that a normal or loosely woven fabric is best treated to obtain water repellency properties. The present invention, however, is not directed to any particular fabric construction but to the process for treating a textile material in such a manner that the combination of water repellency, oil repellency and soil release characteristics are obtained.

While various water and oil repellent materials may be utilized in the process of the invention, the use of fluorocarbons is preferred. Examples of the different types of such materials are set forth in an article by E. G. Higgins entitled "Finishing for Water Repellency," Textile Institute and Industry, September 1966, pages 255–257. Types tested included those set forth on page 3. Two specific systems of the preferred fluorocarbon treatment are the Scotchgard treatment, a registered trademark for a finishing process by Minnesota Mining and Manufacturing Company and a Du Pont process employing their registered product Zepel. Generally, the Scotchgard process employs a minor amount of a textile resin, a fluorocarbon sold under the 3M trademark FC-208 and an extender, Nalan W, sold by Du Pont.

The proportion of the water repellent compound utilized to treat the fabric according to the process of the invention is generally in the same range as that commonly used for imparting water repellency to fabrics. Advantageously, the fluorocarbon concentration is at least about 0.1% by weight of the pad bath or treating solution with the upper limit being dependent upon the degree of water repellency desired. Amounts greater than about 1% generally meet the water and oil repellency standards for rainwear recognized by the industry. When the proportion of the fluorocarbon is less than about 1%, a significant degree of oil repellency is still achieved although the water repellency level may be reduced. Advantageously, between about 0.1% and 5% by weight of the water repellent shall be present on the textile material on a dry weight basis and preferably between about 0.1% and 2%.

The term "textile resin" according to the present invention includes both monomers and polymers which when applied to a textile material and reacted under proper conditions undergo polymerization and/or condensation and are transformed to the thermoset state. Textile resins that may be employed when practicing the present invention include epoxy, acetal, aminoplast resins, etc., with the aminoplast resins being preferred. These nitrogen containing resins when applied to a textile material in the presence of a catalyst at temperatures of from 100° C. to about 300° C. are transformed into the thermoset state. The aminoplast resin condenses with the cellulose molecules and when vinyl groups are present in the aminoplast resin, it undergoes addition polymerization with itself and also with the cellulose molecule if irradiated. The cured textile resin on the textile material affords the textile material a durable press and/or wrinkle resistant characteristic.

Exemplary of the aminoplast resins that may be employed according to the present invention are the urea formaldehydes, e.g., propylene urea formaldehyde, dimethylol urea formaldehyde, etc.; melamine formaldehydes, e.g., tetramethylol melamines, pentamethylol melamines, etc.; ethylene ureas, e.g., dimethylol ethylene urea, dihydroxy dimethylol ethylene urea, ethylene urea formaldehyde, hydroxy ethylene urea formaldehyde, etc., carbamates, e.g., alkyl carabamate formaldehydes, etc.; formaldehyde-acrolein condensation products; formaldehyde-acetone condensation products; alkylol amides, e.g., methylol formamide, methylol acetamide, etc.; acrylamides, e.g., N-methylol acrylamide, N-methylol methacrylamide, N-methylol-N-methacrylamide, N-methyl-methylolacrylamide, N-methylol methylene-bis-(acrylamide), methylene-bis-(N)-methyl acrylamide), etc.; haloethylene acrylamide; diureas, e.g., trimethylol acetylene diurea, tetramethylol-acetylene diurea, etc.; triazones, e.g., dimethylol-N-ethyl triazone, N,N'-ethylene-bis-dimethylol triazone, halotriazones, etc.; haloacetamides, e.g., N-methylol-N-methylchloroacetamide, etc.; urons, e.g., dimethylol uron, dihydroxy dimethylol uron, etc., and the like. Mixtures of aminoplast textile resins are also with the scope of the present invention.

Further exemplary of the textile resins within the scope of the present invention are those which conform to the following structural formulae. In each of the following formulae the variables may be selected as follows:

$R^1$: hydrogen, lower alkyl or residue of saturated or unsaturated aldehyde
$R^2$: hydrogen, lower alkyl or $—CX—CR^3{=}CHR^4$
$R^3$: hydrogen or methyl
$R^4$: hydrogen or lower alkyl
$R^5$: hydrogen, lower alkyl, or $CHR^1OR^4$, at least one $R^5$ being $CHR^1OR^4$
$R^6$: lower alkyl or hydroxy alkyl
$R^7$: hydrogen, hydroxyl or lower alkyl
$R^8$: hydrogen, lower alkyl, alkylol or alkenol
X: sulfur or oxygen and where

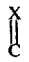

may have substituted therefor

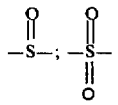

or sulfonium if desired.

I.

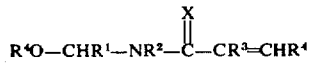

II.

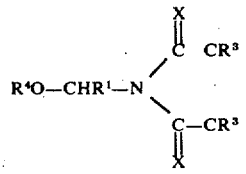

III.

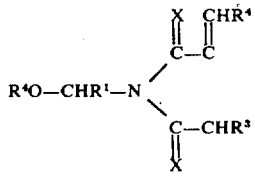

IV.

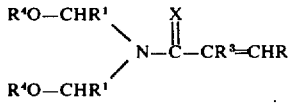

V.

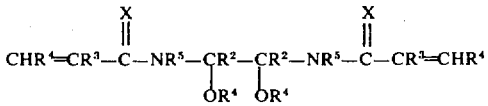

VI.

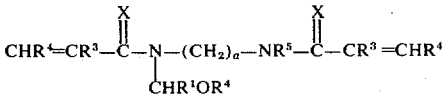

where a is a whole integer from 1 to 6

VII.

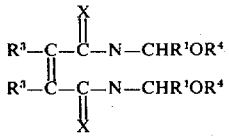

VIII.

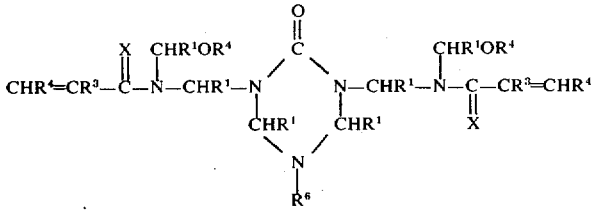

IX.

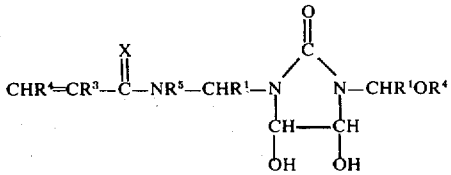

X.

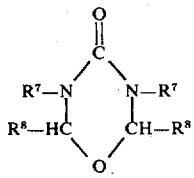

The amount of the textile resin employed is primarily determined by the ultimate use of garments or articles prepared from the fabric. Very small amounts of the resin will afford some improvement and large amounts even greater improvements, but the larger amounts of resin generally adversely affect the hand of the fabric. Hence, the amount of resin employed is preferably that which will afford good crease retention and flat dry properties while not adversely affecting the hand. For the purposes of the present invention, the amount of textile resin in the pad bath may vary between about 2 and 30% by weight. Resin applied to the fabric should be in the range of about 2 to 20% based on the dry weight of the fabric and preferably in the range of about 4 to 9%.

Catalysts employed within the scope of the present invention depend upon the specific textile resin that is applied to the textile material. For instance, if the textile resin has a functional group that is reactive under acidic conditions, then an acid catalyst is used. Likewise, when a functional group is present that is reactive under alkaline conditions, then a base catalyst is used. Furthermore, both acid and base catalysts may be used when both types of functional groups are present in the textile resin. In this instance, the catalyst may be added separately or together. When they are added together, one must be a latent catalyst, i.e., one that will not initiate its reaction during the opposite type reaction, but may be activated subsequently under proper catalytic conditions.

The catalysts useful in activating the acid or base reactive groups are those conventionally used to activate the reaction textile resins containing the same group for reaction with hydroxy groups of cellulose. Preferably, latent acid or base acting catalysts are utilized, that is, compounds which are acidic or basic in character under the curing conditions. The most common acid acting catalysts are the metal salts, for example, magnesium chloride, zinc nitrate and zinc fluoroborate and the amino salts, for example, monoethanolamine hydrochloride and 2-amino-2-methylpropanol nitrate.

The base acting catalyst preferably is a compound which does not initiate substantial reaction between the base reactive group and hydroxy groups of cellulose under normal acid conditions, but does initiate substantial reaction under prescribed conditions, such as elevated temperature or some other activating means, as through use of another chemical compound. For example, an alkali metal sulfite can be padded onto the fabric and be decomposed into strongly basic alkali metal hydroxide by including small amounts of formaldehyde in the steam used for curing.

The latent base acting catalyst utilized herein preferably comprises alkali-metal salts, such as alkali-metal carbonates like sodium carbonate, which is neutral to mildly alkaline, for example, pH of about 8.5 on the fabric but decomposes at temperatures in excess of about 80° C. to form the stronger base sodium oxide which will initiate substantial reaction at the elevated temperatures utilized during curing. Sodium carbonate may be utilized if desired since the pH in the fabric produced by this compound in normal conditions is generally insufficient to initiate the desired degree of reaction under the normal temperature conditions.

If fabrics containing a base reactive group are maintained at pH levels above about 10, however, degradation occurs, so that essentially neutral or mildly alkaline catalysts are preferred when base reactive compounds are utilized.

Additional base acting catalysts include potassium bicarbonate, potassium carbonate, sodium silicate, alkali metal phosphates, such as sodium or potassium phosphates, barium carbonate quaternary ammonium hydroxides and carbonates, for example, lauryl trimethyl ammonium hydroxides and carbonates and the like.

The amount of catalyst to be utilized is that conventionally used in activating the reaction between textile resins and hydroxy groups of cellulose, for example, up to about 15% by weight of an acid acting catalyst in the application bath with the preferred range being from about 1% to about 7%. A preferred range for the base acting catalyst is again the conventional amount and is generally between about 0.2% to about 16%, preferably about 2 to 16%. The amount of catalyst to be utilized will further depend in part on the temperature at which the reaction is conducted and the amount of catalyst consumed in the reaction. For example, when base catalysts are utilized and if a highly acidic group is released during the reaction, the amount of base applied to the textile material should be at least sufficient to provide an excess of base in addition to that which is consumed by the highly acidic group.

The term "soil release" in accordance with the present invention refers to the ability of the fabric to be washed or otherwise treated to remove soil and/or oily materials that have come into contact with said material. The present invention does not per se prevent the attachment of soil or oily materials to the fabric, but hinders such attachment and renders the heretofore uncleanable fabric now susceptible to a successful cleaning operation. While the theory is still somewhat of a mystery, soiled, treated fabric when immersed in the detergent containing wash water experiences an agglomeration of the oil at the fabric surface. This water is basic in nature and it has been determined that soil release is best realized in wash water that is basic in nature. These globules of oil are then removed from the fabric and rise to the surface of the wash water. This phenomenon takes place in the home washer during continued agitation, but the same effect has been observed even under static conditions. In other words, a strip of polyester/cotton fabric treated according to the process of the present invention and soiled with crude oil, when simply immersed in a detergent solution will lose the oil without agitation. The oil just balls up on the fabric, dislodges therefrom, and rises to the surface of the solution.

An added feature of the present invention is the prevention of soil redeposition from the wash water. One of the greatest disadvantages of the synthetic polymers is the feature that even after removing the soil by washing, there is the continued danger that the soil will be redeposited onto the fibers from the wash water before the garment is removed therefrom. It has been observed that the soil releasability of the presently treated fabric diminishes after repeated washings. Even after the ability to remove soil from the fabric has diminished, however, the observation has been made that the prevention of redeposition of soil from the wash water remains potent. This phenomenon likewise is unexplainable, but it has been established that the troublesome soil is negatively charged and presumably there remains enough acid on the fabric to repel the negatively charged soil.

Some of the textile materials that may be treated according to the process of the present invention may not be feasily removed from their environment and washed in a washing machine, e.g., upholstery fabrics. Further, there are also materials that may be treated which when subjected to the action of a washing machine are adversely affected either in structure or in looks. Articles within these classes may still be easily cleaned in place or otherwise by scrubbing the soiled area lightly with a solution of a commercial detergent and water.

The soil release polymer of the present invention may be selected from a large number of different compounds, for example, acid polymers, low molecular weight polyesters, etc. The polymer employed advantageously is capable of forming a film around the fibers that constitute the textile material. Softness of the film is desirable for if the film is too hard, the hand of the textile material may be adversely affected. Further the film preferably has hydrophilic properties and is at least partially insoluble in water. The film, if water soluble, would, of course, be easily washed from the fabric. The polymer from which the film is formed may, however, be water soluble if applied with a textile resin, for during the curing process, the polymer if water soluble, is transformed to a water insoluble film. Furthermore, when the polymer is applied to a substrate without a textile resin, it may likewise be water soluble if the substrate is such that the soil removal is only required once. An acid content of at least 10 weight percent acid calculated as acrylic acid in the soil release polymer from which the film is formed is desirable, and preferably at least 20 weight percent. It has further been observed that acid polymers that afford soil release have a carbon atom to acid group ratio in the repeat group in the range of 2:1 to 30:1, and that an air dried film cast therefrom has a water of imbibition of at least 89%.

Synthetically produced acid polymers within the scope of the present invention may be prepared from any of the polymerizable organic acids, i.e., those having reactive points of unsaturation, e.g., one of the acrylic acids. These polymers may be homopolymers of the acids, or interpolymers of an acid and other monomers copolymerizable therewith so long as at least 10 weight percent acid monomer is present in the polymer. Exemplary of polymerizable acids that may be used, are acrylic acid, methacrylic acid, maleic acid, fumaric acid, itaconic acid, crotonic acid, cinnamic acid, polymerizable sulfonic acids, polymerizable phosphoric acids, etc. Monomers that may be interpolymerized with the acids include any monomers capable of copolymerizing with the acids and which will not detrimentally affect the film-forming properties of the polymer. Suitable monomers include, esters of the above acids prepared by reacting the particular acid with an alkyl alcohol, e.g., acrylic esters such as ethyl acrylate, methyl acrylate, propyl acrylate, isopropyl acrylate, methyl methacrylate, ethyl methacrylate, 2-ethylhexyl acrylate, butyl acrylate, etc.; alkyl fumarates, maleates, crotonates, cinnamates, etc.; vinyl halides; monomers having vinylidene groups; e.g., styrene, acrylonitrile, methylstyrene; substituted vinyl monomers, e.g., chlorostyrene; butadiene, etc. In all of the polymers prepared from the above listed monomers, there must be at least 10 weight percent acid calculated as acrylic acid. It should be noted that various mixtures of the above polymers will work according to the process of the present invention and hence should be considered within the scope of the present invention. Furthermore, salts of the acid polymers, e.g., sodium, potassium, lithium, ammonium, etc., will afford the desired soil release characteristics.

Examples of some of the synthetic acid polymers that may be used according to the present invention are polymerization products of:

ethyl acrylate:acrylic acid
ethyl acrylate:acrylic acid:acrylamide
butyl acrylate:acrylic acid
ethyl acrylate:methacrylic acid
ethyl acrylate:itaconic acid
methyl methacrylate:acrylic acid
2-ethyl hexyl acrylate:acrylic acid
acrylamide:acrylic acid
butyl acrylate:acrylic acid:acrylamide
ethyl acrylate:acrylic acid:N-methylol acrylamide
ethyl acrylate:acrylic acid:styrene
ethyl acrylate:acrylic acid:hydroxy propyl methacrylate
ethyl acrylate:acrylic acid:divinyl benzene
ethyl lacrylate:acrylic acid:allyl acrylamide
ethyl acrylate:acrylic acid: glycidyl acrylate
ethyl acrylate: itaconic acid
ethyl acrylate:sodium styrene sulfonate
ethyl acrylate:crotonic acid
styrene:acrylic acid
ethyl acrylate:acrylic acid:hydroxy ethyl methacrylate
hydroxy ethyl:acrylic:hydroxy ethyl methacrylate
hydroxy ethyl methacrylate:acrylic acid:acrylamide
butyl acrylate:ethyl acrylate:acrylic acid
and the like.

Some acid polymers work better than others, however, and these are preferred. Examples of the preferred acid polymers include (1) copolymers of an acrylic ester such as ethyl acrylate and an acrylic acid that are prepared by polymerizing a co-monomer mixture of from about 10 to 80 parts of the acrylate and about 20 to 90 parts of the acrylic acid and advantageously from about 50 to 80 parts of the acrylate and 20 to 50 parts of the acrylic acid; (2) copolymers of propyl or isopropyl acrylate and acrylic acid wherein the copolymers are prepared by polymerizing a monomer mixture of from about 40 to 57 parts propyl or isopropyl acrylate and about 43 to 60 parts of acrylic acid; (3) copolymers of butyl acrylate and acrylic acid prepared by polymerizing a co-monomer mixture of from about 30 to 70 parts butyl acrylate and about 70 to 30 parts of acrylic acid; (4) copolymers of 2-ethylhexyl-acrylate and acrylic acid prepared by polymerizing a co-monomer mixture of from about 10 to 40 parts of 2-ethyl hexyl acrylate and about 60 to 90 parts of acrylic acid; (5) copolymers substantially identical to the ones listed above with the exception that methacrylic acid is substituted for acrylic acid and the esters are methacrylates instead of acrylates; (6) a copolymer of ethyl acrylate and itaconic acid prepared by polymerizing a monomer mixture comprising about 70 parts ethyl acrylate and about 30 parts itaconic acid; (7) copolymers of the acrylic acid set forth above wherein the acrylates are replaced by methacrylates; (8) a copolymer of acrylamide and acrylic acid prepared by polymerizing a monomer mixture comprising about 10 parts acrylamide and about 90 parts acrylic acid; and (9) terpolymers comprising ethylacrylate, acrylic acid and acrylamide prepared from monomer mixtures of ethyl acrylate, at least 10 parts acrylic acid and up to 20 parts acrylamide. One commercial polymer that has performed very satisfactorily and therefore is among the preferred acid polymers is Acrysol ASE-75, an acrylic emulsion polymer sold by Rohm & Haas, Philadelphia, Pa. *which absorbs about seven times its weight of water when immersed in an aqueous detergent solution for 2 minutes at 140° F.*

The acid polymers suitable for use in practicing the present invention form a hydrophilic film upon drying and afford soil release ability at that point. For unknown reasons, further treatments and/or ingredients will enhance the soil release ability of the substrate. If the substrate having the acid polymer thereon is subjected to textile resin curing conditions, the durability of the soil release ability is enhanced. Likewise the presence of a textile resin catalyst during the textile resin curing conditions further improves soil release ability. Still further, the soil release finish is much more lasting on a substrate when the acid polymer is subjected to textile resin curing conditions in the presence of an aminoplast textile resin. It is known that the film covers the hydrophobic synthetic fiber contents of the textile material without any reaction therewith. What is not understood, however, is the durability of the soil release characteristic. While it is known that there is some reaction between the acid polymer and the textile resin, the reaction mechanism is very speculative. Furthermore, there may be some crosslinking between the cellulose molecules and the acid polymer or there may be just an enhanced physical bond between the textile resin and the acid polymer above and beyond their reactivity.

Soil release polymers, like the textile resins, give some improvement at very low levels on the fabric. Accordingly, as the amount of soil release polymer is increased, the ability of the fabric to release soil increases. Thus, the upper limit on the amount of soil release polymer is determined by economics and resulting adverse effects on the fabric, e.g., the hand of the fabric. Furthermore, practically speaking there is a set range of soil release polymer dictated by commercial success.

The acid polymers, as a general rule, are emulsion polymers containing varying amounts of solids, normally in the range of about 25 to 50 weight percent. The polymer emulsion should be present in the pad bath or other application medium in the range of about 2.5 to 40 weight percent. Otherwise stated, there should be from about 0.25 to 5 weight percent of acid polymer solids applied to the substrate, based on dry weight, and preferably 1.0 to 1.5 weight percent.

The composition used to impregnate the textile material according to the present invention is not limited to including only the possible ingredients heretofore mentioned, e.g., textile resin, textile resin catalyst, soil release polymer and water repellent compound. In addition, other ingredients may be employed such as, for example, emulsifying agents, wetting agents, softeners, etc., and numerous other compounds that enhance the physical characteristics of the fabric. The composition may be applied to the substrate in any suitable manner. For instance, padding of the solution onto fabric is preferred because of ease of operation at that particular stage of the development. The composition may be sprayed on as a liquid; the substrate may be treated with vapors of the compounds if convenient; the substrate may be dipped, etc.

In general, the applicator system is adjusted to provide from 30 to 100 weight percent wet pickup by the fabric from the pad bath. Preferably, however, it has been determined that best results are obtained by providing a wet pickup of from 40 to 60 weight percent from the pad bath.

When the aminoplast textile resin is applied to the substrate, e.g., textile materials, along with the soil release polymer and a fluorocarbon water repellent compound, they may be simultaneously applied from the same pad bath. Simultaneous application is not required though and beneficial results may be realized by first applying the soil release polymer followed by separate applications of the textile resin and the water repellent compound and curing of the textile resin. Insofar as separate application is concerned, however, where the textile resin is applied first and cured and the soil release polymer and the water repellent compound are added separately thereafter, initial soil release ability is outstanding, but not nearly so durable as the simultaneous application or the separate addition where textile resin, soil release polymer and water repellent all are present during curing of the textile resin.

According to the desires of the individual, and the dictates of the ultimate product, separate or simultaneous application of the textile resin, the soil release polymer and the water repellent may be employed. For instance, when treating a textile fabric which is to be converted into work clothes, it would be desirable to have as durable a finish as possible so that the soil release properties will be as long lasting as possible. In this situation, either a simultaneous addition or a separate addition where the soil release polymer is added first would be desired. On the other hand, where the ultimate article of manufacture is not one that will be washed or cleaned on a weekly basis, for instance, the desirable property might possibly be to have a very superior initial soil release property. An example would be upholstery for automobiles, seat covers, wall coverings, etc. For these items it may be more desirable to first apply the textile resin and separately after curing of the textile resin apply the soil release polymer and the water repellent, or just apply the soil release polymer, and the water repellent, etc., as described herein, if a textile resin is not desired. It must be emphasized, however, that under such conditions the water repellent and soil release properties are less durable than those attained by the aforesaid simultaneous means of application.

Advantages afforded by the process of the present invention are available for textile materials treated in almost any form, e.g., fibers, yarns, threads, fabrics or the ultimate product, e.g., a garment, etc.

Garments made from the fabrics treated according to the process of the present invention require no additional steps than normal for the preparation of the conventional durable press garments. In other words, the garment may be folded and pressed on conventional equipment, for example, a Hoffman press. The pressing cycle utilized is standard in the industry and generally involves pressing of the garment for a short period of time, followed by a curing operation in an oven. Alternatively, the garment may be set in a desired configuration under hot, dry conditions, such as by hot pressing without steaming, for example, at temperatures of up to about 300° C. for as long as necessary to cure the resin.

In general, the textile resin may be selected from several general types. According to the type resin selected, one of the following processes may be generally followed to achieve the novel garments produced by the present invention. In each type procedure, the methods of application and order of application of textile resin, soil release polymer, catalysts, water repellent, etc., may be varied as described supra.

Type I (1) Apply textile resin having one type functional group, textile resin catalyst, soil release polymer and water repellent to fabric.

(2) Dry fabric at temperature that is insufficient to initiate catalysis of the textile resin.

(3) Make garment from fabric.

(4) Press garment to produce creases where desired.

(5) Subject garment to temperature sufficient to catalyze and cure the textile resin.

Type II (1) Apply textile resin having more than one type of functional group, textile resin catalysts for each type functional group, soil release polymer and water repellent to fabric.

(2) Subject fabric to conditions whereby one type of functional group reacts and remaining functional groups remain dormant.

(3) Prepare garment from the fabric.

(4) Press creases where desired in garment.

(5) Subject garment to conditions whereby the remaining functional groups are reacted with the cellulose.

Type III (1) Apply textile resin having more than one type of functional group, one type being sites of ethylenic unsaturation, a textile resin catalyst, a soil release polymer and water repellent to the fabric.

(2) Dry the fabric at temperatures such that the textile resin catalyst remains dormant.

(3) Subject the fabric to irradiation.

(4) Make a garment from the fabric.

(5) Produce desired creases in the garment.

(6) Subject the garment to textile resin curing conditions.

In each of the above types of procedures, the ultimate curing of the textile resin may be accomplished prior to the manufacture of the garment whereby a good wash-and-wear fabric having water and oil repellency and soil release properties is produced.

Procedures of Types I, II and III, as is evident, relate to the process of the present invention being applied to a textile material to afford said textile material water and oil repellency, soil release and durable press or wash and wear characteristics. Otherwise than above shown, the various materials are applied and dried, subjected to textile resin curing conditions, etc., according to the specifications described herein.

The drying temperatures that are insufficient to initiate the catalysis are, of course, dependent upon the particular catalyst being employed. In general, however, the drying step is conducted at a rate of approximately 10 to 70 yards per minute at temperatures ranging from about 225 to 300° F. preferably in a tenter frame. The drying temperature range overlaps to some degree with the curing temperature range set forth below. When drying in the overlapping portion of the drying and curing ranges, it is important that there be no premature curing of the textile resin. Time is the prime variable and when drying the substrate in the higher end of the drying temperature range, care must be taken to avoid heating the substrate for a time sufficient to initiate catalysis that would at least partially cure the textile resin.

Irradiation techniques may be employed according to the process of the present invention when a textile resin having ethylenic unsaturation is applied to the textile material. An insulating core transformer, operated at a potential varying between one hundered thousand electron volts and five hundred thousand electron volts may be successfully used to irradiate the textile material. Such a transformer is commercially available from High Voltage Engineering Corporation, Burlington, Mass. The amount of ionizing irradiation necessary according to the present invention is at least 32 electron volts for each ion pair formed. Thus irradiation of 32 volts and above is effective. Both high energy particle and ionizing irradiation are useful according to the present invention. The preferred dosage of irradiation according to the present invention is in the range of one thousand rads to one hundred megarads, a rad being the amount of high energy irradiation of the type which results in energy absorption of one hundred ergs per gram of absorbing material. More preferably, however, the irradiation dosage ranges from 0.5 to 5 megarads.

Curing of the textile resin is accomplished by subjecting the textile material having the textile resin thereon to conditions such that the catalyst initiates a crosslinking reaction between functional groups of the resin and hydroxyl groups of the cellulose in the textile material and converts the resin to the thermoset state. When a 100 percent synthetic fabric is treated, the resin adheres to the material and is converted to a thermoset state. Temperature is the prime mover and generally a temperature in the range of 100° C. to about 300° C. is sufficient. The curing medium that supports the necessary temperature may be any substance that is inert to both the fabric and the ingredients applied thereto, e.g., hot air, steam, etc. In the instance where the textile resin possesses two different types of functional groups, there are actually two curing steps, the first being conducted at a temperature lower than the second and insufficient to initiate the second type of catalysis, e.g., a first partial curing step to initiate alkaline catalysis and a subsequent curing step to initiate acid catalysis and also convert the resin to the thermoset state.

The duration of the various processing steps varies diversely with the particular ingredients employed. In each situation, however, the treatment time is that necessary to sufficiently cause reaction of and/or curing of the textile resin, and preferably, between about 0.1 and 30 minutes.

The following examples illustrate preferred embodiments of the present invention but are not intended to restrict the scope of the invention. In the examples, parts and percentages are by weight. The fabrics prepared in accordance with the procedures set forth in the examples are tested according to the following procedures. The oil repellency test results as set forth in Tables I and II are determined according to the procedure set forth in du Pont Industrial Chemicals Information Bulletin 5C463Rev965. The oil repellency test results in Tables III, IV and V are determined according to the procedure of the 3M Company as set forth in Appendix B of a brochure entitled "Textile Chemicals," dated Jan. 2, 1962, under the section "Test Methods—A. Oil Repellency." All water repellency values are based on the AATCC Standard Test Method 22–1952. All soil release values are determined by comparison to a set of standards having numerical ratings from 1.0 to 5.0, with 1.0 representing very poor stain removal and 5.0 being virtually complete removal of the stain. The fabrics are stained with mineral oil. After staining the fabric is washed one time in a Kenmore automatic washer using one cup of Tide detergent (sold by Procter and Gamble) and a wash water temperature at about 140° F. The fabric is dried for approximately 40 minutes at a temperature of about 160° F. The stains in the dried fabric are compared with the set of standards. The values listed in the tables under the headings 5 and 10 washes represent staining after 5 or 10 normal washings and then a single wash to remove the stain.

Example I.—A pad bath solution is prepared by dispersing in water 24% dihydroxy dimethylol ethylene urea (50% aqueous solution); 4.3% zinc nitrate (50% aqueous solution of $(Zn(NO_3)_2 \cdot 6H_2O)$; 10% emulsion copolymer comprising 70% ethyl acrylate and 30% acrylic acid; 6% FC-208 (a fluorochemical resin emulsion-water repellent sold by 3M Co.), 6% Nalan W (a cationic modified resin water repellent sold by du Pont) and 2.3% ethoxylated alkyl phenol. The above composition is padded onto samples of Dacron/cotton (65/35) fabric to provide about 50% wet pickup. The fabric is then dried on a tenter frame at a speed of about 13 yards per minute and a temperature of about 250°–280° F. until the moisture content of the fabric is reduced to approximately 5%.

Several pairs of men's slacks are then prepared from the treated fabric and pressed on a Hoffman press in the conventional manner and then pressed on a hot-head press, at a cycle of 5 seconds steam, 10 seconds bake and 5 seconds vacuum. The pressed slacks are then suspended from a continuously moving conveyor in an oven and cured for about 15 minutes at 305° F.

The slacks are tested to determine their soil release, oil repellency and water repellency both initially and after laundering a number of times. Even after the testing procedures, the pressed slacks retain creases satisfactorily. The results of the tests are reported in Table I.

Example II.—The procedure of this example is the same as that of Example I except that the 10% copolymer emulsion of 70% ethyl acrylate and 30% acrylic acid is omitted from the pad bath solution. Slacks tested show the results set forth in Table I.

Example III.—The procedure of this example is the same as that of Example I except that the 6% FC-208 and 6% Nalan W are omitted from the pad bath solution. Test results are set forth in Table I.

TABLE I

| Example | I | II | III |
|---|---|---|---|
| As received: | | | |
| Oil repellency | 6 | 5 | 0 |
| Water repellency | 93 | 100 | 0 |
| After 1 wash: | | | |
| Soil release | 4.5 | 1.3 | 4.3 |
| Oil repellency | 6 | 5 | 0 |
| Water repellency | 70 | 100 | 0 |
| After 5 washes: | | | |
| Soil release | 3.5 | 1.0 | 2.8 |
| Oil repellency | 6 | 6 | 1 |
| Water repellency | 50 | 100 | 0 |
| After 10 washes: | | | |
| Soil release | 3.2 | 1.1 | 2.8 |
| Oil repellency | 4 | 6 | 1 |
| Water repellency | 50 | 92 | 0 |

Example IV.—The procedure of this example is the same as Example I except that the dihydroxy dimethylol ethylene urea is replaced with 18% N-methylol acrylamide (50% aqueous solution). Also, the dried fabric is subjected to irradiation in an insulated core transformer manufactured by the High Voltage Engineering Corporation of Burlington, Mass. The fabric is passed through the irradiation equipment at a speed of about 40 yards per minute with a setting on the transformer of about 500 kilovolts and 15 milliamps, the fabric being arranged in a 5 pass festoon during irradiation to produce a dosage of about 2 megarads. The results of tests are reported in Table II.

Example V.—The procedure of this example is the same as Example IV except that the 10% copolymer emulsion of 70% ethyl acrylate and 30% acrylic acid is omitted from the pad bath solution. Slacks tested show the results as set forth in Table II.

Example VI.—The procedure of this example is the same as Example V except that the 6% FC-208 and Nalan W are omitted from the pad bath solution. Slacks tested show the results set forth in Table II.

TABLE II

| Example | IV | V | VI |
|---|---|---|---|
| As received: | | | |
| Oil repellency | 7 | 5 | 0 |
| Water repellency | 100 | 100 | 0 |
| After 1 wash: | | | |
| Soil release | 3.9 | 1.3 | 3.9 |
| Oil repellency | 6 | 6 | 0 |
| Water repellency | 70 | 100 | 0 |
| After 5 washes: | | | |
| Soil release | 2.9 | 1.4 | 2.4 |
| Oil repellency | 6 | 6 | 1 |
| Water repellency | 50 | 100 | 0 |
| After 10 washes: | | | |
| Soil release | 2.1 | 1.5 | 2.2 |
| Oil repellency | 4 | 6 | 1 |
| Water repellency | 50 | 93 | 0 |

Example VII.—The procedure of this example is the same as that of Example I except that the proportion of FC-208 is 0.5% and the proportion of the ethyl acrylate-acrylic acid copolymer is 8%. The test results are reported in Table III.

Example VIII.—The procedure of this example is the same as that of Example I except that the proportion of the FC-208 is 0.25%, the proportion of the ethyl acrylate-acrylic acid copolymer is 8% and the curing temperature is 340° F. The results of testing are reported in Table III.

Example IX.—The procedure of this example is the same as that of Example I except that the proportion of the FC-208 is 0.5%, the proportion of the ethyl acrylate-acrylic acid copolymer is 6% and the curing temperature is 340° F. The test results are reported in Table III.

TABLE III

| | As received, oil repellency | Soil release, after 1 wash |
|---|---|---|
| Example: | | |
| VII | 90 | 3.8 |
| VIII | 70 | 3.0 |
| IX | 70 | 3.6 |

While the oil repellency of the fabrics prepared in Examples VII, VIII and IX is significantly reduced in laundering due to the same amount of FC-208 employed, the fabrics do have a high level initial oil repellency and good soil release and thus would be useful in applications where laundering is infrequent, for example, upholstery fabrics.

Example X.—The procedure of this example is the same as that of Example I except that the proportion of the FC-208 is 6%, the proportion of the ethyl acrylate-acrylic acid copolymer is 2% and the curing temperature is about 325° F. The test results are reported in Table IV.

TABLE IV

| | |
|---|---|
| As received: | |
| Oil repellency | 120 |
| Water repellency | 100 |
| After 1 wash: | |
| Soil release | 4.0 |
| Oil repellency | 120 |
| Water repellency | 100 |
| After 5 washes: | |
| Soil release | 3.0 |
| Oil repellency | 100 |

TABLE IV-continued

| | |
|---|---|
| Water repellency | 50 |

Example XI—The procedure of this example is the same as that of Example I except that 4.3% magnesium chloride ($MgCl_2 \cdot 6H_2O$) is substituted for the zinc nitrate. Results similar to those of Example I are achieved.

Example XII.—The procedure of this example is the same as that of Example I except that the acrylic acid-ethyl acrylate copolymer is replaced with each of the following copolymers with results similar to those of Example I:

Butyl acrylate:acrylic acid (12:88)
Butyl acrylate:acrylic acid (30:70)
Butyl acrylate:acrylic acid (80:20)
Butyl acrylate:acrylic acid (88:12)
Ethyl acrylate:methacrylic acid (70:30)
Ethyl acrylate:itaconic acid (70:30)
Methyl methacrylate:acrylic acid (70:30)
Acrylamide:acrylic acid (10:90)
Ethyl acrylate:acrylic acid:acrylamide (50:38:12)
Ethyl acrylate:acrylic acid:acrylamide (65:3: 5)

Example XIII.—The procedure of this example is the same as that of Example I except that the dihydroxy dimethylol ethylene urea, the copolymer of ethyl acrylate and acrylic acid and the Nalan W are omitted from the pad bath solution. Instead, the ethyl acrylate-acrylic acid copolymer is applied to the fabric and the fabric is dried prior to the application of the pad bath solution. The test results are reported in Table V.

Example XIV.—The procedure of this example is the same as that of Example XIII except that the ethoxylated alkyl phenol is omitted from the pad bath solution. The results of testing the fabrics are reported in Table V.

Example XV.—The procedure of this example is the same as that of Example XIII except that the zinc nitrate and the ethoxylated alkyl phenol are omitted from the pad bath solution. The results of testing the fabrics are reported in Table V.

TABLE V

| Example | XIII | XIV | XV |
|---|---|---|---|
| As received: | | | |
| Oil repellency | 120 | 120 | 120 |
| Water repellency | 90 | 100 | 100 |
| After 1 wash: | | | |
| Soil release | 3.8 | 3.0 | 2.8 |
| Oil repellency | 110 | 50 | 90 |
| Water repellency | 50 | 50 | 50 |
| After 3 washes: | | | |
| Soil release | 3.0 | 2.0 | 2.0 |
| Oil repellency | 50 | 0 | 80 |
| Water repellency | 50 | 50 | 0 |

Example XVI.—The procedure of the above examples is repeated utilizing other fabrics including fabrics containing viscose rayon. Orlon, Acrilan, acetate, polypropylene, etc., fibers with similar improvements in oil and water repellency and soil release characteristics.

While the durability of the oil and water repellency achieved through the process of the present invention, in some cases, may be somewhat below industry standards for rainwear, after repeated laundering, the level of oil and water repellency which is retained provides benefits and advantages in many non-rainwear applications. For example, tablecloths or wearing apparel such as shirts or slacks exhibit improved performance so that materials such as food or drinks which are accidentally spilled thereon can be wiped from the surface of the fabric without excessive amounts soaking into the fabric. Furthermore, the balance can be removed in subsequent laundering.

The above description and examples show that the present invention provides novel textile materials having the heretofore unattainable combination of oil and water repellency and soil release characteristics. Furthermore, this combination of characteristics can be achieved with fabrics including synthetic polymeric fibers. As a result, the fabrics and garments of the invention can be laundered to remove stains without destroying the water and oil repellency characteristics. In addition, through the process of the invention, it is possible to achieve water and oil repellency and soil release in fabrics having durable press and/or wash and wear characteristics.

Having thus disclosed the invention, what is claimed is:

1. A process for imparting oil and water repellency, soil release and durable press characteristics to a cellulosic-containing textile material which comprises applying thereto an aminoplast textile resin; a textile resin catalyst, a fluorocarbon oil and water repellent material, and a synthetic acid soil release copolymer derived from an ethylenically unsaturated carboxylic acid, said acid polymer comprising at least about 20 weight percent acid calculated as acrylic acid; and subjecting said textile material to textile resin curing conditions at a temperature between about 100° and 200° C., whereby the textile resin is crosslinked to the textile material, the proportion of said fluorocarbon oil and water repellent material on said textile material being between about 0.01% and 5% by weight based on the dry weight of the textile material and the proportion of said acid polymer on said textile material being between about 0.25% and 5% by weight based on the dry weight of the textile material.

2. A process for imparting oil and water repellency, soil release and durable press characteristics to a cellulosic containing textile material which comprises applying thereto an unsaturated aminoplast textile resin, a textile resin catalyst, a fluorocarbon oil and water repellent material and a synthetic acid soil release copolymer derived from an ethylenically unsaturated carboxylic acid, said acid polymer comprising at least about 20 weight percent acid calculated as acrylic acid; drying said textile material at a temperature in the range of about 225° F. to 300° F.; subjecting said textile material to between about 1000 rads and 100 megarads irradiation; and subsequently curing the textile resin at a temperature between about 100° and 300° C., the proportion of said fluorocarbon oil and water repellent material on said textile material being between about 0.01% and 5% by weight based on the dry weight of the textile material and the proportion of said acid polymer on said textile material being between about 0.25% and 5% by weight based on the dry weight of the textile material.

3. A process for imparting oil and water repellency, soil release and durable press characteristics to a polyethylene terephthalate/cotton (65/35) textile material which comprises:

(a) applying thereto an aqueous system consisting essentially of about 2 to 30% of an aqueous solution of N-methylol acrylamide, about 1 to 15% of an aqueous solution of a catalyst selected from the group consisting of zinc nitrate and magnesium chloride, at least about 0.1% of an organic fluorocarbon oil and water repellent material, about 2.5 to 40% of an aqueous dispersion of a synthetic acid polymer prepared by polymerizing a monomeric mixture of about 10 to 80 parts ethyl acrylate and about 20 to 90 parts acrylic acid, and water; said aqueous dispersion being applied to the textile material in the range of 30 to 100 weight percent of the textile material;

(b) drying the textile material at a temperature in the range of about 225° F. to 300° F.;

(c) subjecting the textile material to irradiation such that said material is exposed to a dosage of about 1000 rads to 100 megarads; and (d) heating the textile material at a temperature in the range of about 100° C. to 300° C. to cure the textile resin; the proportion of said fluorocarbon oil and water repellent material on said textile material being between about 0.01% and 5% by weight based on the dry weight of the textile material and the proportion of said acid polymer on said textile material being between about 0.25% and 5% by weight based on the dry weight of the textile material.

4. The process as defined in claim 1 wherein the synthetic acid polymer is prepared by polymerizing a monomeric mixture comprising an acrylic ester and an acrylic acid.

5. A textile material having improved oil and water repellency, soil release and durable press characteristics produced according to the process of claim 1.

6. A textile material having improved oil and water repellency, soil release and durable press characteristics produced according to the process of claim 2.

7. A textile material having improved oil and water repellency, soil release and durable press characteristics produced according to the process of claim 3.

8. The process as defined in claim 1 wherein the soil release polymer and the oil and water repellent material are applied sequentially.

9. A process as defined in claim 1 wherein the textile resin catalyst is selected from the group consisting of metal salts and amino salts.

10. The process as defined in claim 1 wherein the textile resin is selected from the group consisting of acrylamides and ethylene ureas.

11. The process as defined in claim 1 wherein the textile resin is selected from the group consisting of N-methylol acrylamide and dihydroxydimethylol ethylene urea.

12. The process as defined in claim 1 wherein the textile material is a polyester/cotton blend.

13. The process as defined in claim 1 wherein the soil release polymer is prepared by polymerizing a monomeric mixture comprising about 10 to 80 parts of an acrylic ester and about 20 to 90 parts of an acrylic acid.

14. The process as defined in claim 2 wherein the textile resin is N-methylol acrylamide.

15. The process as defined in claim 2 wherein the textile material is subjected to an irradiation dosage of about 0.5 to 5 megarads.

16. The textile material as defined in claim 1 wherein said textile material is a polyethylene terephthalate/-cotton blend.

*17. In a process for improving the soil release properties of a textile material wherein the textile material is impregnated with a composition including a durable press textile reactant selected from water-soluble precondensates of formaldehyde with amino compounds and a water-insoluble acrylic hydrophilic polymer which absorbs about seven times its weight of water when immersed in an aqueous detergent solution for 2 minutes at 140° F., said polymer being an addition polymer of at least one ethylenically unsaturated monomer having one or more acid groups, and then drying and curing, the improvement which comprises applying said durable press reactant and hydrophilic polymer to said textile in a stable aqueous mixture with an oil and water repellent fluoro-acrylic polymer characterized by* $(CF_2)$ *groups and a terminal* $CF_3$ *group, the amount of fluoro-acrylic polymer being in the range of 4-100% based on the weight of said hydrophilic polymer, the proportion of said fluoro-acrylic polymer on said textile material being between about 0.01% and 5% by weight based on the dry weight of the textile material and the proportion of said acrylic hydrophilic polymer on said textile material being between about 0.25% and 5% by weight based on the dry weight of the textile material.*

*18. The process of claim 17 wherein said material is cellulosic, polyester, or a mixture thereof.*

*19. The process of claim 17 wherein said mixture is applied as an aqueous emulsion including an ethylene oxide emulsifying agent.*

*20. A process according to claim 17 wherein said acrylic hydrophilic polymer is a methacrylic acid/ethyl acrylate copolymer.*

*21. The process of claim 17 wherein said polymer is one selected from the group consisting of polyacrylic acid; acrylic acid and methacrylic acid copolymers with styrene; copolymers of itaconic acid and acrylic acid; copolymers of ethyl acrylate and methacrylic acid; terpolymers of methacrylic acid, butadiene and styrene; and terpolymers of monomethyl itaconate, acrylic acid and itaconic acid.*

*22. A durable press textile having improved soil release properties, said textile being finished with a cured durable press and soil release finish consisting essentially of a mixture of durable press reactant selected from water-soluble precondensates of formaldehyde with amino compounds and a water-insoluble acrylic hydrophilic polymer which absorbs about seven times its weight of water when immersed in an aqueous detergent solution for 2 minutes at 140° F., said polymer being an addition polymer of at least one ethylenically unsaturated monomer having one or more acid groups, and oil and water repellent fluoro-acrylic polymer characterized by* $(CF_2)$ *groups and a terminal* $CF_3$ *group, the amount of fluoro-acrylic polymer being in the range of 4–100% based on the weight of hydrophilic polymer, the proportion of said fluoro-acrylic polymer on said textile material being between about 0.01% and 5% by weight based on the dry weight of the textile material and the proportion of said acrylic hydrophilic polymer on said textile material being between about 0.25% and 5% by weight based on the dry weight of the textile material.*

* * * * *